UNITED STATES PATENT OFFICE.

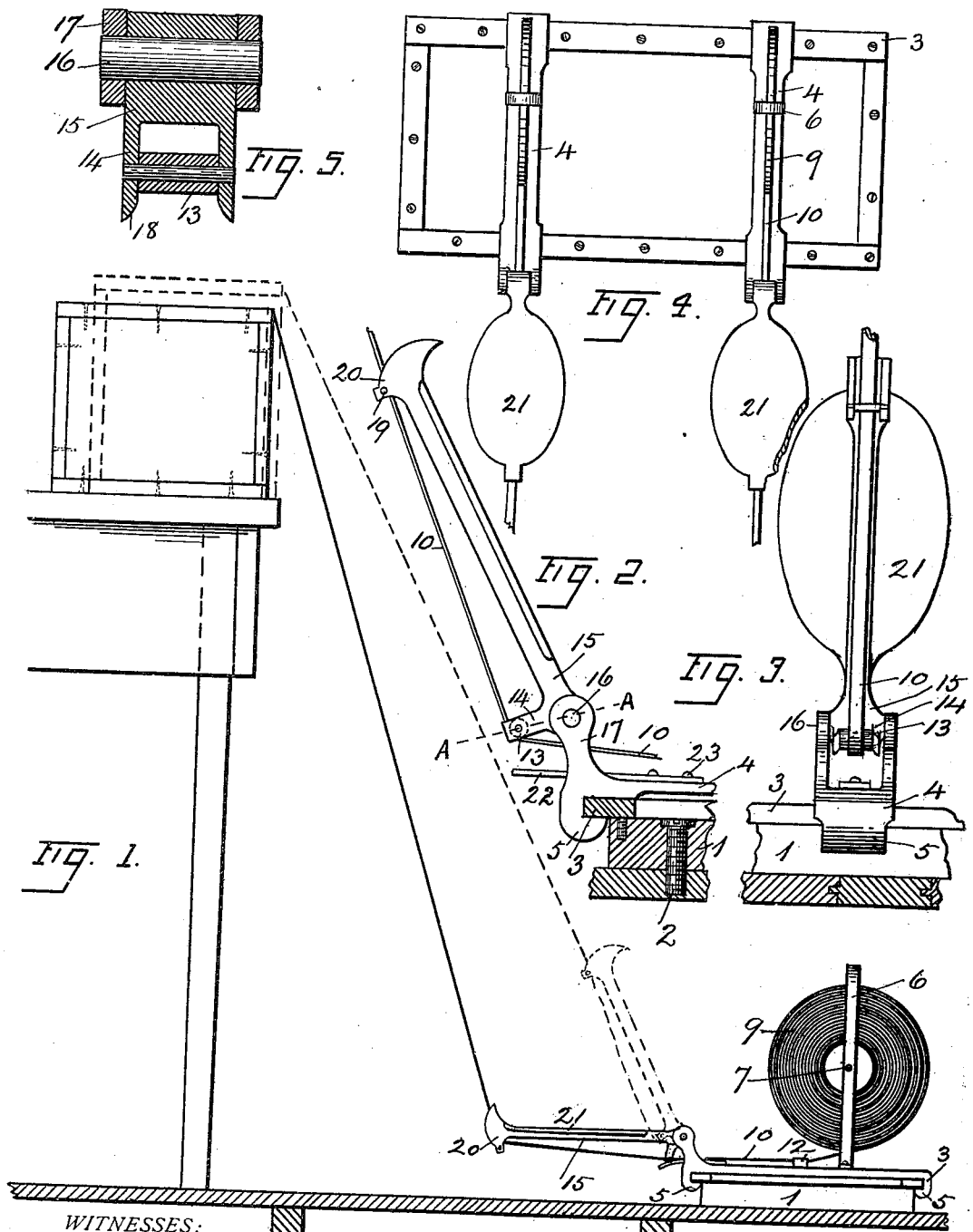

FELIX F. LEVY AND FRANKLIN A. LITTLE, OF SAN FRANCISCO, CALIFORNIA; SAID LITTLE ASSIGNOR TO SAID LEVY AND PRENTISS CROWELL, OF SAME PLACE.

BOX-STRAPPING MACHINE.

SPECIFICATION forming part of Letters Patent No. 666,232, dated January 15, 1901.

Application filed July 27, 1900. Serial No. 25,061. (No model.)

*To all whom it may concern:*

Be it known that we, FELIX F. LEVY and FRANKLIN A. LITTLE, citizens of the United States, residing at San Francisco, in the county of San Francisco and State of California, have invented certain new and useful Improvements in Box-Strapping Machines, of which the following is a specification.

Our invention relates to a machine for strapping boxes or packing-cases with strap-iron, the object of our invention being to provide a device of this character by means of which cases may be strapped more expeditiously and with less labor than heretofore and in which the strap shall be applied very tightly.

Our invention therefore resides in the novel construction, combination, and arrangement of parts for the above ends hereinafter fully specified, and particularly pointed out in the claims.

In the accompanying drawings, Figure 1 is a side elevation of the machine, showing the mode of operation thereof in strapping a packing-case. Fig. 2 is a side view of the lever of the machine and a portion of the carriage on a larger scale, the bed-plate being shown in section. Fig. 3 is a front view of said lever. Fig. 4 is a plan view of the machine, and Fig. 5 is a section on the line A A of Fig. 2.

Referring to the drawings, 1 represents any suitable bed-plate, preferably secured firmly to the floor by means of screws, as shown at 2, or otherwise. The long sides of said bed-plate 1 are protected at their edges by guide-plates 3, and upon said plates are movably supported carriages 4, the ends of which are bent over to form hooks 5 around said guides. Upon each carriage are mounted stanchions 6, joined at the top and perforated, as at 7, to form bearings for the spindle 8 of a reel 9 of strap-iron 10. We have herein shown two of such carriages, each carrying a reel of strap-iron, and said carriages are made slidable upon the bed-plate, so as to be readily adjusted, respectively, to each other, according to the size of the box or case which is to be strapped.

The strap-iron 10 from the reel passes under a staple 12 on the carriage, which acts as a guide, and then along said carriage to the end thereof, where it passes around a roller 13, supported between arms 14 of a lever 15, pivoted at 16 between extensions 17 of the carriage. The ends of the arms 14 are preferably beveled or flared, as shown at 18, to center the strap-iron upon the roller. The strap-iron passes from the roller up along the under side of the lever 15 and over a pin 19, secured in extensions 20 from the upper end of said lever.

A suitable length of strap-iron having been unwound from the reel, the operator nails the free end of the strap-iron to the upper side of the box or case to be strapped near its farther edge, and then presses the foot firmly upon the upper surface of the lever 15, preferably formed with a broad foot-plate 21. The downward movement of the lever brings the roller 13 into proximity with the upper surface of a flat spring 22, secured at 23 on the upper side of the carriage and projecting therefrom between the extensions 17, and the strap-iron is thereby clamped between said roller and the upper surface of said spring, so that the unwinding of the strap-iron from the reel is at this point arrested. The continued downward movement of the lever 15 has the effect of imparting a powerful tension to the wire and draws it down very tight upon the box or case. The operator now nails down the strap-iron, which has been laid down tight upon the upper side of the box, and then releases said lever, and repeats the operation at the other end of the box with the wire from the second reel. He then turns the box over and repeats these operations upon the next side, and so on for the other sides of the box.

For adjusting the distance of the reels from each other all that is necessary is to push the carriages along the guides with the foot, as they will remain in any place to which they have been thus shifted.

We claim—

1. In a case-strapping machine, the combination of a source of supply of strap-iron, a lever pivoted to swing downwardly, means for guiding said strap-iron along said lever, and a clamping device brought into operation by said lever at a predetermined point in its descent, and positively clamping said strap-iron against further movement along said lever from its pivot, substantially as described.

2. In a case-strapping machine, the combination of a source of supply of strap-iron, a lever pivoted to swing downwardly, means for guiding the strap-iron from said source along said lever, and a clamp brought into operation by said lever at a predetermined point in its descent, and positively clamping said strap-iron against further movement along said lever from its pivot, said lever being then permitted further downward movement to tighten the strap-iron extending beyond said clamp, substantially as described.

3. In a case-strapping machine, the comnation of a source of supply of strap-iron, a lever, means for guiding the strap-iron from said source of supply along said lever, and a clamp at the pivotal end of said lever arranged to clamp said strap-iron at a predetermined point in the descent of the lever and prevent forward movement thereof, substantially as described.

4. In a case-strapping machine, the combination of a downwardly-swinging lever, a support for a source of supply of strap-iron, means for guiding the strap-iron from said support along said lever to the free end thereof, a roller carried by said lever, a fixed spring-plate, between which plate and the roller the strap-iron passes, said strap-iron being clamped between the plate and roller when the lever has been swung downwardly through a predetermined distance, substantially as described.

5. In a case-strapping machine, the combination of a suitable support, guides thereon, carriages sliding on said guides, a reel of wire carried by each carriage, a lever pivotally mounted at its lower end upon each carriage, means for guiding the wire coming from the reel along the lever, and a clamp arranged to be actuated by said lever in its downward movement to arrest the further withdrawal of said strap-iron, substantially as described.

In witness whereof we have hereunto set our hands in the presence of two subscribing witnesses.

FELIX F. LEVY.
F. A. LITTLE.

Witnesses:
FRANCIS M. WRIGHT,
Z. A. DANIELS.